US010689601B2

(12) United States Patent
Colson et al.

(10) Patent No.: US 10,689,601 B2
(45) Date of Patent: Jun. 23, 2020

(54) METHOD OF FORMING AN ANTIFOAM GRANULE CONTAINING A SILICONE POLYETHER

(71) Applicant: Dow Silicones Corporation, Midland, MI (US)

(72) Inventors: Anick Colson, Champion (BE); Laurence Gallez, Jurbise (BE); Christel Simon, Lobbes (BE); Nicolas Ziolkowski, Nivelles (BE)

(73) Assignee: DOW SILICONES CORPORATION, Midland, MI (US)

( * ) Notice: Subject to any disclaimer, the term of this patent is extended or adjusted under 35 U.S.C. 154(b) by 140 days.

(21) Appl. No.: 15/965,152

(22) Filed: Apr. 27, 2018

(65) Prior Publication Data

US 2018/0245020 A1 Aug. 30, 2018

Related U.S. Application Data

(62) Division of application No. 14/909,333, filed as application No. PCT/EP2014/065923 on Jul. 24, 2014, now Pat. No. 9,994,795.

(60) Provisional application No. 61/865,256, filed on Aug. 13, 2013.

(51) Int. Cl.
| | |
|---|---|
| *C11D 1/82* | (2006.01) |
| *C11D 3/00* | (2006.01) |
| *B01D 19/04* | (2006.01) |
| *B01F 17/54* | (2006.01) |
| *C11D 3/37* | (2006.01) |
| *B05D 1/02* | (2006.01) |

(52) U.S. Cl.
CPC ........ *C11D 3/0026* (2013.01); *B01D 19/0404* (2013.01); *B01D 19/0409* (2013.01); *B01F 17/0071* (2013.01); *B05D 1/02* (2013.01); *C11D 3/3738* (2013.01); *C11D 3/3749* (2013.01)

(58) Field of Classification Search
CPC ....... C11D 1/82; C11D 3/0026; C11D 3/1246; C11D 3/128; C11D 3/162; C11D 3/3738; C11D 7/14; C11D 9/36; C11D 11/0017
See application file for complete search history.

(56) References Cited

U.S. PATENT DOCUMENTS

| | | | | |
|---|---|---|---|---|
| 5,045,225 | A | * | 9/1991 | Aronson ............ B01D 19/0409 510/303 |
| 5,380,464 | A | | 1/1995 | McGee et al. |
| 5,543,082 | A | | 8/1996 | McGee et al. |
| 5,668,101 | A | * | 9/1997 | Kolaitis ............. B01D 19/0409 510/446 |
| 5,686,404 | A | | 11/1997 | Jeuniaux |
| 5,783,173 | A | * | 7/1998 | Bonda ..................... A61K 8/35 424/400 |
| 5,861,368 | A | * | 1/1999 | Kolaitis ............. B01D 19/0409 510/446 |
| 6,124,490 | A | | 9/2000 | Gormley et al. |
| 6,162,330 | A | | 12/2000 | Northfleet et al. |
| 6,165,968 | A | | 12/2000 | Lenoble |
| 6,512,015 | B1 | | 1/2003 | Elms et al. |
| 6,521,586 | B1 | | 2/2003 | Hoogland et al. |
| 6,521,587 | B1 | | 2/2003 | L'Hostis et al. |
| 7,294,653 | B2 | | 11/2007 | Zeng |
| 7,432,235 | B2 | | 10/2008 | Takewaki et al. |
| 7,550,514 | B2 | | 6/2009 | Rautschek et al. |
| 7,619,035 | B2 | | 11/2009 | Henning et al. |
| 8,084,566 | B2 | | 12/2011 | Rautschek et al. |
| 8,147,854 | B2 | | 4/2012 | Okawa et al. |
| 8,222,303 | B2 | | 7/2012 | Herzig et al. |
| 8,362,185 | B2 | | 1/2013 | Wagner et al. |
| 8,420,748 | B2 | | 4/2013 | Henning et al. |
| 8,481,476 | B2 | | 7/2013 | Paul |

(Continued)

FOREIGN PATENT DOCUMENTS

| | | |
|---|---|---|
| CA | 2128799 A1 | 1/1995 |
| DE | 102006044839 A1 | 4/2008 |

(Continued)

OTHER PUBLICATIONS

English language abstract and machine translation for WO2011074282 (A1) extracted from http://worldwide.espacenet.com database on Jul. 23, 2018, 20 pages.
English language abstract and machine translation for JP2002053440 (A) extracted from http://worldwide.espacenet.com database on Jul. 23, 2018, 16 pages.
English language abstract and machine translation for EP1284282 (A1) extracted from http://worldwide.espacenet.com database on Jul. 23, 2018, 15 pages.

(Continued)

*Primary Examiner* — Charles I Boyer
(74) *Attorney, Agent, or Firm* — Warner Norcross + Judd LLP

(57) ABSTRACT

An antifoam granule includes a carrier and an antifoam compound deposited on the carrier. The antifoam granule is formed using a method that includes providing an emulsion and contacting the emulsion with a carrier to deposit the antifoam compound on the carrier and form the antifoam granule. The emulsion includes an oil phase, an aqueous phase, and a silicone polyether. The oil phase includes an antifoam compound. The antifoam compound includes a hydrophobic fluid and a hydrophobic filler dispersed in the hydrophobic fluid. The aqueous phase includes a binder and water. The emulsion is formed using a method that includes combining the oil phase, the aqueous phase, and the silicone polyether to form the emulsion. The antifoam granule is also utilized in a method of facilitating rinsing of a detergent from a substrate that includes applying the detergent, including the antifoam granule, to the substrate and rinsing the substrate.

17 Claims, 5 Drawing Sheets

(56) References Cited

U.S. PATENT DOCUMENTS

| | | | |
|---|---|---|---|
| 8,633,147 B2 | 1/2014 | Paul et al. | |
| 9,040,474 B2 | 5/2015 | Creutz et al. | |
| 9,994,795 B2 | 6/2018 | Colson et al. | |
| 2005/0002890 A1* | 1/2005 | Gardel | A61K 8/064 424/70.16 |
| 2005/0031560 A9* | 2/2005 | Simonnet | A61K 8/064 424/63 |
| 2006/0013792 A1* | 1/2006 | Fontaine | A61K 8/37 424/70.12 |
| 2006/0018867 A1 | 1/2006 | Kawasaki et al. | |
| 2006/0024251 A1* | 2/2006 | Gardel | A61K 8/064 424/63 |
| 2007/0161539 A1 | 7/2007 | Hernandez | |
| 2008/0145436 A1* | 6/2008 | Lorant | A61K 8/064 424/489 |
| 2009/0069522 A1 | 3/2009 | Hessefort et al. | |
| 2009/0149573 A1 | 6/2009 | Venzmer et al. | |
| 2010/0233104 A1 | 9/2010 | Drake et al. | |
| 2010/0310617 A1* | 12/2010 | Zhang | A61K 8/064 424/401 |
| 2011/0021688 A1 | 1/2011 | Herzig et al. | |
| 2011/0039948 A1 | 2/2011 | Lange et al. | |
| 2011/0182844 A1 | 7/2011 | Wagner et al. | |
| 2012/0027704 A1 | 2/2012 | Henning et al. | |
| 2012/0064022 A1 | 3/2012 | Wray et al. | |
| 2012/0065118 A1 | 3/2012 | Paul et al. | |
| 2012/0276029 A1* | 11/2012 | Ascione | A61K 8/06 424/62 |
| 2012/0279514 A1* | 11/2012 | Ricard | A45D 34/041 132/200 |
| 2013/0309498 A1 | 11/2013 | Chao et al. | |
| 2014/0142020 A1 | 5/2014 | Yueqin et al. | |
| 2014/0221508 A1* | 8/2014 | Matsumura | B01D 19/0409 516/116 |
| 2015/0038388 A1 | 2/2015 | Gallez et al. | |

FOREIGN PATENT DOCUMENTS

| | | |
|---|---|---|
| EP | 0163352 B1 | 11/1990 |
| EP | 0663225 A1 | 7/1995 |
| EP | 0997180 A1 | 5/2000 |
| EP | 1284282 A1 | 2/2003 |
| EP | 1167502 B1 | 4/2004 |
| GB | 2350117 A | 11/2000 |
| JP | H07204409 A | 8/1995 |
| JP | 2000198997 A | 7/2000 |
| JP | 2000218103 A | 8/2000 |
| JP | 2002053440 A | 2/2002 |
| WO | WO1999032539 A1 | 7/1999 |
| WO | WO2011074282 A1 | 6/2001 |
| WO | WO2004047779 A2 | 6/2004 |
| WO | WO2011107397 A1 | 9/2011 |
| WO | 2012076186 A2 | 6/2012 |
| WO | WO20120134651 A1 | 10/2012 |

OTHER PUBLICATIONS

English language abstract and machine translation for DE102006044839 (A1) extracted from http://worldwide.espacenet.com database on Jul. 23, 2018, 33 pages.

International Search Report for PCT/EP2014/065923 dated Oct. 2, 2014, 2 pages.

* cited by examiner

METHOD OF FORMING AN ANTIFOAM GRANULE CONTAINING A SILICONE POLYETHER

CROSS-REFERENCE TO RELATED APPLICATIONS

This application is a Divisional of National Stage application Ser. No. 14/909,333 filed on Feb. 1, 2016, which claims priority to and all advantages of International Patent Application No. PCT/EP2014/65923, filed on Jul. 24, 2014, which claims the benefit of U.S. Application No. 61/865,256 filed on Aug. 13, 2013.

FIELD OF THE DISCLOSURE

The present disclosure relates to a method of forming an antifoam granule using an emulsion that includes an oil phase including an antifoam compound, an aqueous phase, and a silicone polyether. The disclosure also relates to a method of facilitating rinsing of a detergent from a substrate by utilizing the antifoam granule.

DESCRIPTION OF THE RELATED ART

Approximately seventy percent of the world's population washes clothes by hand or in semi-automatic machines. When doing so, consumers typically expect to observe foam generation from a detergent because foam generation is associated with detergent efficiency. Removing foam typically requires numerous rinses, which adds complexity to rinse cycles, increases water usage and costs, and wastes time and water. For this reason, antifoam compounds are added to detergents. However, there are many issues associated with use of antifoam compounds. Some do not become active at appropriate times while others are expensive to purchase, handle, and use. Some eliminate foam from washing but not from rinsing, which leads to decreased consumer confidence in the detergent. Still others entirely eliminate foam, which again leads to decreased consumer confidence and decreases marketability. Accordingly, there remains an opportunity to develop an improved composition for foam control.

SUMMARY OF THE DISCLOSURE

The present disclosure provides a method of forming an antifoam granule. The antifoam granule includes a carrier and an antifoam compound dispersed on the carrier. The method includes the step of providing an emulsion and contacting the emulsion with the carrier to deposit the antifoam compound on the carrier and thereby form the antifoam granule. The emulsion includes an oil phase, an aqueous phase, and a silicone polyether. The oil phase includes the antifoam compound. The antifoam compound itself includes a hydrophobic fluid and a hydrophobic filler dispersed in the hydrophobic fluid. The hydrophobic fluid has a surface tension from 23 to 40 mN/m. The aqueous phase includes a binder and water. The present disclosure also provides a method of forming the aforementioned emulsion. The method of forming the emulsion includes the step of combining the oil phase, the aqueous phase, and the silicone polyether to form the emulsion. The disclosure further provides a method of facilitating rinsing of a detergent from a substrate. The method of facilitating rinsing includes the steps of applying the detergent to the substrate and rinsing the substrate, wherein the detergent includes the aforementioned antifoam granule.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE DISCLOSURE

Figure 1A:
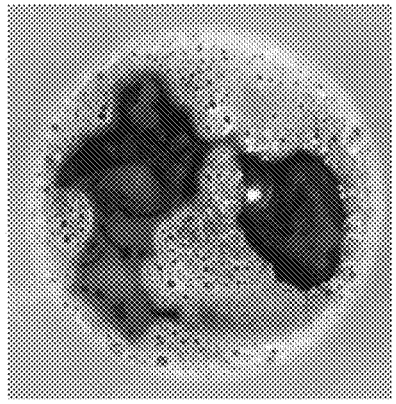
FIGS. 1A-1K are independent photographs of the top surfaces of water deposited in containers after rinsing woven cotton that was washed in water using comparative detergent/emulsions, as described in detail in the examples.

The present disclosure provides a method of forming an antifoam granule. The antifoam granule includes a carrier and an antifoam compound deposited on the carrier. The method of forming the antifoam granule includes the step of providing an emulsion, as described in greater detail below, and contacting the emulsion with the carrier to deposit the antifoam compound on the carrier and thereby form the antifoam granule.

The step of contacting may be further described as spraying droplets of the emulsion on the carrier. Alternatively, the step of contacting may be further described as immersing the carrier in the emulsion. The step of spraying and/or immersing may be any known in the art.

In still other embodiments, the antifoam granules can be made by an agglomeration process in which the antifoam compound is sprayed onto the carrier while agitating the carrier. The carrier can be agitated in a high shear mixer through which the carrier passes continuously. One type of suitable mixer is a vertical, continuous high shear mixer in which the emulsion in a liquid state is sprayed onto the particles. One example of such a mixer is a Flexomix mixer supplied by Hosokawa Schugi. Alternative suitable mixers include horizontal high shear mixers, in which an annular layer of the powder-liquid mixture is formed in the mixing chamber, with a residence time of a few seconds up to about 2 minutes. Non-limiting examples of this family of machines are pin mixers (e.g. TAG series supplied by LB, RM-type machines from Rubberg-Mischtechnik or pin mixers supplied by Lodige), and paddle mixers. Other non-limiting suitable mixers include Glatt granulators, ploughshare mixers, as sold, for example, by Lodige GmbH, twin counter-rotating paddle mixers, known as Forberg-type mixers, and intensive mixers including a high shear mixing arm within a rotating cylindrical vessel. The antifoam granules can have a mean particle diameter of at least 0.1 mm, typically over 0.25 or 0.5 mm, up to a mean diameter of 1.2 or 1.5 or even 2 mm. After formation, the granules can be dried in a fluidized bed.

A post coating of the granule may be performed using a dispersion or suspension of a film forming polymer or of a binder as those listed below. The coating may be performed using the same or a different binder, or a combination of binders, using a spray drying technique or a fluidized bed.

Antifoam Granule:

The antifoam granule itself includes the carrier and the antifoam compound deposited on the carrier. The carrier is not particularly limited and may be a solid particulate carrier, of natural or synthetic origin, and include silicates and aluminasilicates such as zeolites, magnesium silicate, calcium silicate, sodium silicate, mica, bentonite, diatomite, sepiolite, natural or modified clays, talc, neat or treated silica, carbohydrates such as lactose, dextrose, maltodextrin, alginate, chitin, chitosan, soda ash, starch, wood flour, cellulose, cellulose derivatives such as sodium carboxymethylcellulose, calcium sulfate, sodium sulfate, magnesium sulfate, calcium carbonate, sodium acetate, sodium bicarbonate, sodium perborate, sodium citrate, sodium carbonate, phosphates such as sodium tripolyphosphate, or combinations thereof. The carrier may include a mixture of different carriers. In one embodiment, the carrier is chosen from the group of zeolite, starch, sodium sulfate, sodium carbonate, and combinations thereof.

The mean particle size of the carrier is typically in the range of from 1 to 250 μm, of from 5 μm to 30 or 40 μm, of from 1 to 25 μm, or of from 1 μm up to 15 or 20 μm. The carrier may compose of from 60% by weight to 85 or 90% by weight of the final antifoam granule. The antifoam compound typically composes of from 5% by weight to 20 or 25% by weight of the final antifoam granule.

The mean particle size of the carrier is typically measured by the method called 'laser diffraction' using the ISO procedure described in ISO 13320:2009. The equipment used is a Sympatec Helos KF (trade mark) fitted with a Rodos/M dry disperser. The pressure applied to disperse the carrier through the laser is 2 bars and the lens used for the measurement is the lens R3. The method includes of the following steps: (1) Adding approximately 50 g of a representative sample in a feeder, (2) starting the measurement using a lens R3 (range of particles is 0.9 μm-175 μm), (3) utilizing the system to automatically inject the sample with a pressured system (RODOS) through a laser beam, and (4) collecting the diffracted laser beam on a sensor, and calculating a particle size distribution by correlation.

Emulsion:

Referring back to the emulsion, emulsions are typically classified into different categories according to a chemical nature of a dispersed phase and a continuous phase. A first category is an oil-in-water (O/W) emulsion. O/W emulsions typically include a non-polar dispersed phase (e.g. oil) in an aqueous continuous phase (e.g. water) which forms particles. For purposes of the instant disclosure, the terminology "oil" includes non-polar molecules and may include any non-polar compound, as described in greater detail below. A second category of emulsion is a water-in-oil (W/O) emulsion. W/0 emulsions typically include a polar dispersed phase such as water or other hydrophilic substances or mixtures thereof in a non-polar continuous phase such as a hydrophobic oil or polymer. A third category is a water-in-oil-in-water (W/O/W) emulsion. These types of emulsions include a polar dispersed phase in a non-polar continuous phase which is, in turn, dispersed in a polar continuous phase. For example, W/O/W emulsions may include water droplets entrapped within larger oil droplets that in turn are dispersed in a continuous water phase. The instant emulsion may be any of these.

The instant emulsion includes an oil phase and an aqueous phase. The oil phase may be the dispersed phase or the continuous phase. Similarly, the aqueous phase may be the dispersed phase or the continuous phase. In various embodiments, the oil phase is present in the emulsion in an amount of from 20 to 80, 30 to 70, 35 to 65, 40 to 50, parts by weight per 100 parts by weight of the emulsion. In some embodiments, the aqueous phase is present in the emulsion in an amount of from 10 to 70, of from 20 to 60, of from 30 to 55, parts by weight per 100 parts by weight of the emulsion. The silicone polyether, described below, is present in an amount of from 1 to 20, of from 1 to 10, or of from 4 to 7 wt %, by weight of the emulsion.

Oil Phase:

Antifoam Compound:

Hydrophobic Fluid:

The antifoam compound includes a hydrophobic fluid and a hydrophobic filler dispersed in the hydrophobic fluid. The antifoam compound may consist essentially of, consist of, or be, the combination of the hydrophobic fluid and the hydrophobic filler dispersed in the hydrophobic fluid. The terminology "consist essentially of" describes an embodiment wherein the antifoam compound is free of any other silicones, organic polymers, and/or other compounds that may affect the antifoaming properties of the antifoam compound.

The hydrophobic fluid has a surface tension of from 23 to 40 mN/m, alternatively of from 24 to 40 mN/m, alternatively of from 27 to 40 mN/m, alternatively of from 27 to 35 mN/m, alternatively of from 27 to 30 mN/m.

The surface tension of the hydrophobic fluid can be measured using at least two methods. The first method is the drop shape method wherein surface tension is measured at 25° C. In this test, a drop of the hydrophobic fluid or mixture of hydrophobic fluids is made in air by using a syringe and the surface tension is calculated from measurements of the pendant drop curvature. The drop shape test method is further explained in the paper 'Surface tension measurements using the drop shape method' by R. P. Woodward published by First Ten Angstroms of 465 Dinwiddie Street, Portsmouth, Va., U.S.A., which is expressly incorporated herein by reference relative to this test method. The surface tension of the hydrophobic fluid measured by the drop shape method may be alternatively described as static surface tension. Unless otherwise indicated, the drop shape method is the method used in the present application.

The second method utilizes a tensiometer, e.g. an Attension Sigma 700 Force Tensiometer. In this method, the equipment is calibrated before use by using a calibration weight which weighs 1798.6 mg and should be measured to within +/−0.5 mg. A de-ionized water sample is tested and should be measured to within (+/−1.0 dyne/cm) of 72.4 dyne/cm. The surface tension of the hydrophobic fluid may be measured by filling a 4 oz sample jar half full with a sample of the hydrophobic fluid and placing it on the vessel stage; loading a glass cover slip into the stirrup holder, and using a propane torch, carefully flash both sides of the glass cover slip. The stirrup holder is placed with the glass cover slip onto the balance hook, and the sample vessel stage is raised until the sample surface is just below the bottom of the glass cover slip. The surface tension measurements are taken at 22° C., using a wetting depth of 5 mm, a speed up of 5 mm/min, and a speed down of 5 mm/min. Four measurements are taken after the first insult, and the average taken. In some instances, the surface tension may be obtained from the raw material supplier.

The hydrophobic fluid is not particularly limited except for the aforementioned surface tension. In one embodiment, the hydrophobic fluid is a mixture of hydrophobic fluids. In various embodiments, the hydrophobic fluid is free of polar groups having active hydrogen atoms that can be ionized in an aqueous medium, e.g. carboxylic, sulfonate, sulfate, amide and/or phosphate groups.

In another embodiment, the hydrophobic fluid is a silicone fluid, such as an organopolysiloxane. One type of fluid organopolysiloxane which is suitable for use is a fluid organopolysiloxane including pendant esterified carboxyalkyl groups. The fluid organopolysiloxane including pendant esterified carboxyalkyl groups can be a substantially linear polydiorganosiloxane or can be a branched organopolysiloxane including up to 10 mole % branching units. The carboxyalkyl groups can include 2 to 12 carbon atoms, particularly 2 to 5 carbon atoms, and can be carboxymethyl, 2-carboxyethyl, 2-methyl-2-carboxyethyl or 2-ethyl-2-carboxyethyl groups. The carboxyalkyl groups can be esterified by alkyl, aryl, aralkyl or cycloalkyl groups, for example the carboxyalkyl groups can each be esterified by an alkyl group having 1 to 20 carbon atoms. In various embodiments, all or most of the carboxyalkyl groups are esterified by an alkyl group having 8 to 18 carbon atoms, for example a n-octyl, 2-ethylhexyl, lauryl, tetradecyl, hexadecyl or stearyl group. A mixture of different alkyl groups, for example alkyl groups of different chain length, can be used such as a mixture of C12 and C14 alkyl groups or a mixture of C12 and C13 alkyl groups.

In various embodiments, at least 10% of the siloxane units in such an organopolysiloxane carry a pendant esterified carboxyalkyl group, for example 25 to 100% of the siloxane units may carry a pendant esterified carboxyalkyl group. Other substituents in the organopolysiloxane can be selected from alkyl groups having 1 to 20 carbon atoms and phenyl groups. The organopolysiloxane can be prepared by reaction of an organopolysiloxane including Si—H groups with an ester of an ethylenically unsaturated carboxylic acid, for example an acrylate or methacrylate, in the presence of a hydrosilylation catalyst. The organopolysiloxane including Si—H groups can be poly(methylhydrogensiloxane) or a dimethylsiloxane methylhydrogensiloxane copolymer, so that in many cases most or all of the siloxane groups in the organopolysiloxane include a methyl substituent.

The organopolysiloxane including pendant esterified carboxyalkyl groups may also have pendant alkyl substituents having 2 to 20 carbon atoms in addition to esterified carboxyalkyl groups and methyl groups. Such alkyl substituents can be ethyl, hexyl, octyl, lauryl, tetradecyl, hexadecyl or stearyl substituents. The fluid organopolysiloxane may include alkyl substituents having 8 to 18 carbon atoms bonded to Si atoms of the organopolysiloxane as well as methyl groups and carboxyalkyl groups esterified by an alkyl group having 8 to 18 carbon atoms. The fluid organopolysiloxane can be prepared by reacting poly(methylhydrogensiloxane) or a dimethylsiloxane methylhydrogensiloxane copolymer with a mixture of one or more alpha-alkene having 8 to 18 carbon atoms and one or more 8 to 18 carbon containing alkyl methacrylate or acrylate ester, such as a mixture of C12 to C14 alkenes and C12 to C14 alkyl methacrylates. The molar ratio of pendant esterified carboxyalkyl groups to pendant alkyl substituents having 2 to 20 carbon atoms can be 10:1 to 1:2, or any range there between, with each siloxane unit typically including a methyl group. A substantially linear polydiorganosiloxane comprising methyl C12-C14 alkyl siloxane units and methyl 2-methyl-2-carboxyethyl siloxane units in substantially equimolar amounts, in which the carboxyethyl groups are esterified by C12-C13 alkyl groups, has a surface tension of 27.2 mN/m.

An alternative organopolysiloxane is a fluid organopolysiloxane including aryl groups or alkylaryl groups. In various embodiments phenyl groups, bonded to silicon. The aryl or alkaryl organopolysiloxane can be a substantially linear polydiorganosiloxane or can be a branched organopolysiloxane including up to 10 mole % branching units. Organopolysiloxanes having a phenyl group bonded to substantially all the silicon atoms of the organopolysiloxane can be effective. One example of such an organopolysiloxane is a poly(methylphenylsiloxane) or an organopolysiloxane including 2-phenylpropyl groups. One trimethylsiloxy-terminated poly(methylphenylsiloxane) has a surface tension of 27.1 mN/m. A silanol-terminated poly(methylphenylsiloxane) of similar molecular weight has a surface tension of 33.9 mN/m. Another suitable poly(methylphenylsiloxane), described in Example 1 of WO-2008/152042, expressly incorporated herein by reference relative to suitable siloxanes, has a surface tension of 32.8 mN/m. Another suitable organopolysiloxane is alphamethylstyrene siloxane, such as one having a surface tension of 27.0 mN/m. All of these fluid organopolysiloxanes including phenyl groups are suitable for use as the hydrophobic fluid.

In various embodiments, the silicone fluid is chosen from the group of alkylsiloxanes having an alkyl group having from 12 to 14 carbon atoms, arylsiloxanes, alkylarylsiloxanes, a siloxane that is the reaction product an MeH siloxane, an alkylmethacrylate having an alkyl group having 8 to 30 carbon atoms, and an alkene having 8 to 30 carbon atoms, and combinations thereof.

The hydrophobic fluid can alternatively be an organic fluid, a fluid that includes no silicon atoms, or combination of these and/or the aforementioned silicone fluids. In one embodiment, the hydrophobic fluid is a hydrocarbon fluid. In another embodiment, the hydrophobic fluid is polyisobutylene. Liquid polyisobutylene sold by Univar (The Netherlands) under the trade mark Dynapak Poly 55 has a surface tension of 30.4 mN/m. Another non-limiting example of a suitable organic polybutene is INDOPOL® H25 (polybutene hydrophobic oil) sold by INEOS® (Lyndhurst, United Kingdom), having a surface tension of 30.0 mN/m. Alternative organic hydrophobic fluids which are suitable are polyethers in which the repeating ether unit has at least 3 carbon atoms, for example polypropylene oxide, polybutylene oxide or polytetramethylene oxide. Polypropylene oxide has a surface tension of 29.0 mN/m.

In various embodiments, the hydrophobic fluid is present in an amount of from 75 to 99, of from 80 to 95, of from 90 to 95, parts by weight per 100 parts by weight of the oil phase. In other embodiments, the hydrophobic fluid is present in an amount of from 20 to 70, of from 30 to 60, or of from 40 to 50, parts by weight per 100 parts by weight of the emulsion.

Hydrophobic Filler:

The hydrophobic filler is dispersed in the hydrophobic fluid. The terminology "dispersed in" may describe that the hydrophobic filler is homogeneously or heterogeneously dispersed in the hydrophobic fluid. Alternatively, this terminology may describe an intimate blend of the hydrophobic filler and the hydrophobic fluid. The hydrophobic filler may be solid at 100° C., such as silica, which, in one embodiment, has a surface area as measured by BET measurement of at least about 50 $m^2$/g. Alternatively, the hydrophobic filler can be titania, ground quartz, alumina, an aluminosilicate, zinc oxide, magnesium oxide, a salt of an aliphatic carboxylic acids, a reaction product of an isocyanate with an amine, e.g. cyclohexylamine, or an alkyl amide such as ethylenebisstearamide or methylenebisstearamide. Combinations of two or more of these can be used.

Some of the fillers described above are not naturally hydrophobic, but can be used if made hydrophobic. This can be done either in situ (e.g. when dispersed in the hydrophobic fluid), or by pre-treatment of the filler prior to mixing with the polysiloxane fluid or other hydrophobic fluid. One example of a suitable filler is silica that has been made hydrophobic. Suitable silica materials include those that are prepared by heating, e.g. fumed silica, or precipitation. The silica may have an average particle size of about 0.5 to about 50 µm, alternatively about 2 to about 30, and alternatively about 5 to about 25 µm. The silica can be made hydrophobic by treatment with a fatty acid or by the use of methyl substituted organosilicon materials such as dimethylsiloxane polymers, which are end-blocked with silanol or silicon-bonded alkoxy groups, hexamethyldisilazane, hexamethyldisiloxane or organosilicon resins including $(CH_3)_3SiO_{1/2}$ groups and silanol groups. Hydrophobing is typically carried out at a temperature of at least 100° C. Mixtures of fillers can be used, for example a highly hydrophobic silica filler such as that sold under the trademark SIPERNAT® D10 from Evonik Industries (Germany) can be used together with a partially hydrophobic silica such as that sold under the trademark AEROSIL® R972 from Evonik Industries.

In various embodiments, the hydrophobic filler is present in an amount of from 0.5 to 50, of from 1 to 25, of from 1 to 15, or of from 2 to 12, parts by weight per 100 parts by weight of the hydrophobic fluid. In other embodiments, the hydrophobic filler is present in an amount of from 1 to 15, or of from 1 to 5, parts by weight per 100 parts by weight of the emulsion.

Additional Fluids:

In addition to the hydrophobic fluid that forms the antifoam compound, the oil phase may include one or more additional organosilicon resins. The organosilicon resin may be a non-linear siloxane resin. In one embodiment, the organosilicon resin includes siloxane units having the formula $R'_a SiO_{(4-a)/2}$, wherein R' denotes a hydroxyl, hydrocarbon, or hydrocarbonoxy group, and wherein a has an average value of from about 0.5 to about 2.4. In one embodiment, the organosilicon resin includes monovalent trihydrocarbonsiloxy (M) groups of the formula $R''_3 SiO_{1/2}$ and tetrafunctional (Q) groups $SiO_{4/2}$, wherein R" denotes a monovalent hydrocarbon group. In another embodiment, the M/Q ratio is in the range about 0.4:1 to about 2.5:1 (equivalent to the value of a in the formula $R'_a SiO_{(4-a)/2}$ of about 0.86 to about 2.15) for use in laundry detergent applications. In still another embodiment, the M/Q ratio is from about 0.4:1 to about 1.1:1 for use in laundry detergent applications. In yet another embodiment, M/Q ratio about 0.5:1 to about 0.8:1 (equivalent to the value of a in the formula $R'_a SiO_{(4-a)/2}$ of about 1.0 to about 1.33) for use in laundry detergent applications. The organosilicon resin may be a liquid or solid at room temperature. In various embodiments, liquid organosilicon resins (e.g. those having a M/Q ratio greater than about 1.2) may also be used.

In still other embodiments, the organosilicon resin includes only M and Q groups, as described above. However, it is contemplated that a resin comprising M groups, trivalent $R''SiO_{3/2}$ (T) groups and Q groups may also or alternatively be used. The organosilicon resin may also include divalent units $R''2SiO_{2/2}$, e.g. in an amount of about 20% or less of all siloxane units present. The group R" may include an alkyl group (e.g. methyl, ethyl, or phenyl) having from about 1 to about 6 carbon atoms. It may be desirable that about 80% to substantially all of the R" groups present be methyl groups. Other hydrocarbon groups may also be present including, but not limited to, alkenyl groups such as dimethylvinylsilyl units (e.g. not exceeding about 5% of the total R" groups). Silicon-bonded hydroxyl groups and/or alkoxy, (e.g. methoxy) groups may also be present. Such organosilicon resins can be made in solvent or in situ, e.g. by hydrolysis of certain silane materials. In one embodiment, the organosilicon resin is made by hydrolysis and condensation in the presence of a solvent (e.g. xylene) of a precursor of the tetravalent siloxy unit (e.g. tetra-orthosilicate, tetraethyl orthosilicate, polyethyl silicate or sodium silicate), and a precursor of monovalent trialkylsiloxy units (e.g. trimethylchlorosilane, trimethylethoxysilane, hexamethyldisiloxane, or hexamethyldisilazane). The resulting MQ resin may, if desired, be further trimethylsilylated so that it is reacted out. Residual Si—OH groups may be heated in the presence of a base to cause self-condensation of the resin by elimination of Si—OH groups.

The additional fluid may be used in conjunction with any hydrophobic fluid or mixture of hydrophobic fluids such that the additional fluid does not decrease the surface tension of the hydrophobic fluid to less than 23 mN/m, alternatively less than 24 mN/m, alternatively less than 27 mN/m, or increase the surface tension of the hydrophobic fluid to greater than 40 mN/m.

In other embodiments, the additional fluid is present in an amount of from 0.1 to 5, of from 0.1 to 5, or of from 0.5 to 1.5, or up to 1, parts by weight per 100 parts by weight of the oil phase. Alternatively, the additional fluid may be present in an amount of from 0.05 to 10, of from 0.1 to 0.5, or up to 0.5, parts by weight per 100 parts by weight of the emulsion.

Aqueous Phase:

Binder:

Referring back to the aqueous phase, the aqueous phase includes a binder and water. The binder may be dispersed in water such that additional water, independent of the binder, may not be needed. The aqueous phase may consist essentially of, consist of, or be, the binder as an aqueous dispersion or solution, or the binder and the water.

In one embodiment, the binder includes a water-soluble or water-dispersible polymer, such as a film-forming polymer (e.g. aqueous binder). Various non-limiting examples of suitable binders include polycarboxylate binders which are water soluble polymers such as polymerised products of unsaturated monomeric acids, e.g. acrylic acid, maleic acid, maleic anhydride, fumaric acid, itaconic acid, aconitic acid, mesaconic acid, citraconic acid and methylenemalonic acid; polyoxyalkylene polymers such as polyethylene glycol; carbohydrates such as polysaccharides, cationic starch, sugar syrup binders, malitol syrup, maltodextrin solution, water-soluble or water-swellable cellulose derivatives such as sodium carboxymethylcellulose, hydroxyethyl cellulose, hydoxypropylcellulose quaternized with glycidyl $C_{12}$-$C_{22}$ alkyl dimethyl ammonium chloride, cationic hydroxyalkyl cellulose including those with the CTFA designation Polyquaternium 10, Polyquaternium 67, Polyquaternium 4; homopolymers or copolymers prepared from monoethylenically unsaturated monomers, i.e., allylic and vinyl monomers, and combinations thereof. Other non-limiting examples include homopolymers or copolymers prepared from acrylic or methacrylic monomers. Non-limiting examples of monomers that may be used to prepare the homopolymer or copolymer include dialkylaminoalkyl acrylates, dialkylaminoalkyl methacrylates, dialkylaminoalkyl acrylamides, dialkylaminoalkylalkyl acrylamides, dialkylaminoalkyl methacrylamides, dialkylaminoalkylalkyl methacrylamides, in which the alkyl groups are alkyl groups including 1-4 carbon atoms, vinylpyridine, vinylimidazole; wherein the monomers may be partially quaternized, fully quaternized, or salified, by an acid, a quaternizing agent, benzyl chloride, methyl chloride, an alkyl chloride, an aryl chlorides, or dimethylsulfate. In another embodiment, the binder is a water soluble or water-dispersible polymer. In still another embodiment, the binder is a maleic acid/acrylic acid copolymer. As used herein, the terminology "salified" refers to the salt formed by the acid-base reaction between the amino and an acid. Combinations of any one or more of the above may also be utilized.

In various embodiments, the binder is present in an amount of from 20 to 60, of from 20 to 50, of from 25 to 50, of from 30 to 50, parts by weight per 100 parts by weight of the aqueous phase. In other embodiments, the binder is present in an amount of from 10 to 50, of from 10 to 40, of from 10 to 25, or of from 15 to 20, parts by weight per 100 parts by weight of the emulsion.

Water:

The aqueous phase also includes water. As described above, the water may be included in an aqueous dispersion or solution of the binder, may be independent, or both. The water may be tap water, well water, purified water, deionized water, and combinations thereof and may be present in the dispersion in varying amounts depending on the type of emulsion. In various embodiments, the water is present in an amount of from 20 to 80, of from 20 to 70, or of from 30 to 60, parts by weight per 100 parts by weight of the aqueous phase. In other embodiments, the water is present in an amount of from 10 to 60, of from 10 to 50, parts by weight per 100 parts by weight of the emulsion.

Silicone Polyether:

The emulsion also includes a silicone polyether (SPE). The emulsion may include, consist essentially of, consist of, or be, the (combination of the) oil phase, the aqueous phase, and the silicone polyether.

The silicone polyether may have a viscosity of less than 50,000 mPa·s, more typically less than 30,000 mPa·s at 25° C. The silicone polyether composition may have a viscosity of from 100 mPa·s to less than 25000 mPa·s at 25° C., as determined by measuring the time required for a fixed volume of samples to pass through a calibrated glass capillary using "gravity flow", e.g. using ASTM D-445, IP 71.

The silicone polyether may be present in the emulsion in any amount of from 1 to 20, 2 to 10, 4 to 7, or 1, 2, 3, 4, 5, 6, 7, 8, 9, or 10, weight percent. It is contemplated that the silicone polyether may be present in any value, or range of values, both whole and fractional, within or between any one or more values described above. In various embodiments, any one or more of the aforementioned amount(s) may vary by ±1, 2, 3, 4, 5, 6, 7, 8, 9, or 10%.

In various embodiments, the emulsion includes less than 10, alternatively less than 5, alternatively less than 1, parts by weight of an emulsifier that is not the aforementioned silicone polyether, by weight of the emulsion. In other embodiments, the emulsion is free of any emulsifiers that are not the aforementioned silicone polyether.

In various embodiments, the silicone polyether is chosen from:

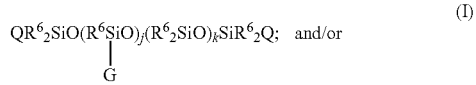

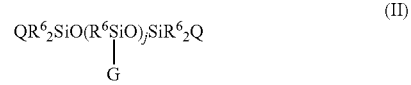

and combinations thereof, wherein $R^6$ is a monovalent hydrocarbon or halogenated hydrocarbon group, Q is $R^6$ or G, j has a value of 1 to 150, k has a value of 0 to 400 and G is a polyoxyalkylene group having a formula chosen from:

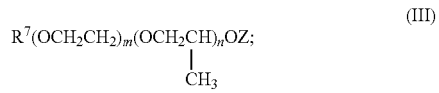

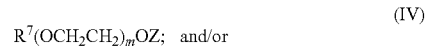

and combinations thereof, wherein $R^7$ is a divalent hydrocarbon group having 1 to 20 carbon atoms, m has an average value of about 1 to 50, n has an average value of 1 to about 50 and Z is selected from the group consisting of hydrogen, an alkyl radical having 1 to 6 carbon atoms and an acyl group having 2 to 6 carbon atoms. The siloxane portion of the silicone polyether may be linear or branched.

Monovalent hydrocarbon groups suitable as $R^6$ include alkyl radicals, such as methyl, ethyl, propyl, butyl, hexyl, octyl, and decyl; cycloaliphatic groups, such as cyclohexyl; aryl groups such as phenyl, tolyl, and xylyl; arylalkyl groups such as benzyl and phenylethyl. Monovalent halogenated hydrocarbon groups include any monovalent hydrocarbon radical noted above and has at least one of its hydrogen atoms replaced with a halogen, such as fluorine, chlorine, or bromine.

The group $R^7$ hereinabove is a divalent hydrocarbon group having from 1 to 20 carbon atoms which is exemplified by groups such as alkylene radicals including methylene, ethylene, propylene, butylene, phenylene, trimethylene, 2-methyltrimethylene, pentamethylene, hexamethylene, 3-ethyl-hexamethylene, octamethylene, —CH$_2$(CH$_3$)CH—, —CH$_2$CH(CH$_3$)CH$_2$—, and —(CH$_2$)$_{18}$—, cycloalkylene radicals such as cyclohexylene, arylene radicals such as phenylene, combinations of divalent hydrocarbon radicals such as benzylene (—C$_6$H$_4$CH$_2$—), hydroxylated hydrocarbon residues, chloroethylene, fluoroethylene, —CH$_2$CH$_2$CH$_2$OCH$_2$—, —CH$_2$CH$_2$OCH$_2$CH$_2$—, —CH$_2$CH$_2$OCH(CH$_3$)CH$_2$—, and —CH$_2$OCH$_2$CH$_2$OCH$_2$CH$_2$—.

Method of Forming the Emulsion:

The disclosure also provides a method of forming the emulsion. The method includes the step of combining the oil phase, the aqueous phase, and the silicone polyether, to form the emulsion. The silicone polyether may be combined with the aqueous phase or the oil phase to form a first mixture, and subsequently, the oil phase or aqueous phase may be added to the first mixture. The oil and aqueous phases may be combined to form a first mixture, and subsequently the silicone polyether may be added to emulsify the oil and aqueous phases. In one embodiment, the step of combining includes the step of mechanically agitating the oil phase, the aqueous phase, the silicone polyether, and combinations thereof. In another embodiment, the step of combining includes the step of applying shear to the oil phase, the aqueous phase, and the silicone polyether. In one embodiment, the emulsion is formed by simple agitation to form a coarse mixture (e.g. water in oil or oil in water). This mixture can then be emulsified. During emulsification, the mixture may be inverted into an emulsion. Any of the aforementioned steps may be accomplished by using any stirring or mixing equipments or homogenizers and combinations thereof.

Detergent Composition:

The antifoam granule may be added to a detergent composition in an amount of from 0.1 to 10% by weight of the detergent composition. In one embodiment, the antifoam granule is added at a level of from 0.4 to 5% by weight. The detergent composition may be a laundry detergent, but can alternatively be a detergent for dish washing or a detergent composition for personal care, such as a shampoo, shower gel, or soap bar.

The detergent composition may optionally include, or be free of, at least one detersive surfactant, which may be chosen from soap and non-soap anionic, cationic, nonionic, amphoteric, and zwitterionic detergent-active surfactants, or mixtures thereof. This surfactant, if utilized, is not the same as the aforementioned silicone polyether. Many suitable detergent-active surfactants are available and are fully described in the literature in "Surface-Active Agents and Detergents", Volumes I and II, by Schwartz, Perry and Berch, which is expressly incorporated herein by reference relative to these surfactants. In one embodiment, a detersive surfactant includes soaps and/or synthetic non-soap anionic and/or nonionic compounds. The total amount of surfactant present is generally of from 5 to 40 wt % of the detergent composition.

Suitable non-limiting examples of anionic surfactants include alkylbenzene sulfonates, particularly linear alkylbenzene sulfonates having an alkyl chain length of about 8 to about 16 carbon atoms; primary and secondary alkyl sulfates, particularly primary alkyl sulfates having an alkyl chain length of from 8 to 16 carbon atoms; alkyl ethersulfates; olefin sulfonates; alkyl xylene sulfonates; dialkyl sulfosuccinates; and fatty acid ester sulfonates. Sodium salts may also be used. The detergent composition may include an anionic surfactant, optionally, with a nonionic surfactant. Nonionic surfactants that may be used include primary and secondary alcohol ethoxylates, including aliphatic alcohols having of from 8 to 20 carbon atoms ethoxylated with an average of from 1 to 20 moles (e.g. of from 1 to 10 moles) of ethylene oxide per mole of alcohol. Suitable non-ethoxylated nonionic surfactants include alkylpolyglycosides, glycerol monoethers, and polyhydroxyamides. Examples of cationic organic detergent surfactants include alkylamine salts, quaternary ammonium salts, sulfonium salts, and phosphonium salts.

The detergent composition may also include one or more detergency builders. The total amount of detergency builder may be of from 5 to 80 wt %, alternatively of from 10 to 60 wt %. Inorganic builders that may be utilized include sodium carbonate, crystalline and amorphous aluminosilicates (e.g. zeolites), and layered silicates. Inorganic phosphate builders (e.g. sodium orthophosphate, pyrophosphate, and tripolyphosphate) may also be present. Organic builders that may be utilized include polycarboxylate polymers such as polyacrylates, acrylic/maleic copolymers, and acrylic phosphinates; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates, alkyl- and alkenylmalonates and succinates; and sulfonated fatty acid salts. Builders, both inorganic and organic, may be present in alkali metal salt (e.g. sodium salt) form.

The detergent composition may also include a peroxy bleach compound (e.g. an inorganic persalt or an organic peroxyacid) capable of yielding hydrogen peroxide in aqueous solution. Suitable inorganic persalts include sodium perborate monohydrate and tetrahydrate and sodium percarbonate. The peroxy bleach compound may be used in conjunction with a bleach activator (bleach precursor), for example, a peroxycarboxylic acid precursor, and, more especially a peracetic acid precursor such as tetraacetyl ethylenediamine, or a peroxybenzoic acid or peroxycarbonic acid precursor.

Detergent compositions intended for personal care use (e.g. shampoo compositions) may include other ingredients such as conditioners to facilitate combing and/or styling of the hair and/or to improve the shine and/or softness of the hair, perfumes, fragrances, colorants such as dyes, essential oils, vitamins, buffering agents, stabilizers, and preservatives, any combination thereof, or the like.

The detergent composition may be in powder form, tablet form, or in the form of a solid bar (soap bar). Laundry detergents for hand washing or for use in semi-automatic machines are commonly sold in powder form. Detergent powders can be prepared by spray-drying a slurry of compatible heat insensitive ingredients or by mixing and granulating raw materials, e.g. using a high-speed mixer/granulator. Less robust or more heat sensitive ingredients can be subsequently incorporated into the detergent powder.

Method of Facilitating Rinsing of a Detergent from a Substrate:

This disclosure also provides a method of facilitating rinsing of a detergent from a substrate. The detergent may be as described above and may be a detergent composition. The substrate is not particularly limited and may be a textile (e.g. natural, synthetic, mineral, plant or animal), cloth, fabric, stone, plastic, cement, wood, glass, ceramics, polymers, keratinous substrates and the like. In various embodiments, the substrate is one or more items of consumer clothing. In other embodiments, the substrate is one or more items of consumer goods such as glasses, dishes, etc. In other embodiments, the substrate is skin or hair. The method includes the step of applying the detergent to the substrate and the step of rinsing the substrate, wherein the detergent includes the aforementioned antifoam granule. The detergent may be applied by any method known in the art. Similarly, the step of rinsing may be completed by any method known in the art. Rinsing includes soaking in fresh or in rinse water, disposing under running water.

EXAMPLES

TABLE 1

HYDROPHOBIC FLUIDS

| Hydrophobic Fluid Examples | Description | Surface Tension (mN/m) (Drop Shape Method) |
|---|---|---|
| HF1 | Siloxane Comprising Methyl C12-C14 Alkyl And Methyl 2-Methyl-2-Carboxyethylgroups, The Latter Being Esterified By C12-C13 Alkyl Groups | 27.2 |
| HF2 | C12-14 Alkylsiloxane | 31.0 |
| HF3 | Polyisobutylene (PIB/Indopol H-25) | 29.0 |

TABLE 1-continued

HYDROPHOBIC FLUIDS

| Hydrophobic Fluid Examples | Description | Surface Tension (mN/m) (Drop Shape Method) |
|---|---|---|
| HF4 | Phenylsiloxane | 27.1 |
| HF5 | Alphamethylstyrene siloxane | 27.0 |

TABLE 2

SILICONE POLYETHERS

| Silicone Polyether | % wt Siloxane | % wt EO | % wt PO | Molecular Weight (g/mol) | Viscosity (cSt) | HLB (calculated) |
|---|---|---|---|---|---|---|
| SPE1 | 53 | 47 | 0 | 3000 | 360 | 6.7 |
| SPE2 | 19 | 35 | 46 | 27900 | 2305 | 6.6 |
| SPE3 | 19 | 35 | 46 | 58000 | 4450 | 7.3 |
| SPE4 | 17 | 0 | 83 | 5100 | 312 | −0.6 |
| SPE5 | 32 | 68 | 0 | 600 | 41 | 11.5 |

Silicone Polyethers Combined with Various High Surface Tension Antifoam Compounds Emulsion Preparation:

91 g of a hydrophobic fluid or a mixture of hydrophobic fluids, each having a surface tension of from 27 to 40 mN/m, is mixed with hydrophobic silica, i.e., 6 g of CAB-O-SIL® TS-530 and 3 g of AEROSIL® R-972 (as hydrophobic fillers) in a SpeedMixer™ to form various antifoam compounds.

34.5 g of the resulting antifoam compounds is then mixed with 34.5 g of a 40% maleic acid/acrylic acid copolymer solution in water (Sokalan CP5) and 3.5 g of silicone polyether emulsifier and 2.7 g water to form a series of emulsions of this disclosure, as summarized in Table 3 below.

Granule Preparation:

The resulting emulsions are then sprayed onto 200 g of sodium sulfate powder (as the carrier). The spraying is stopped when the powder agglomerates into granules having an average diameter ranging of from 400 to 600 μm. The granules are then dried in a fluidized bed for 20 minutes at 60° C., to form the antifoam granules of Tables 3 and 4. The quantity of emulsion sprayed is recorded to calculate an amount of the antifoam compound deposited on the granules (dry). The granules of these examples include 11.63% of the antifoam compound.

TABLE 3

GRANULE COMPOSITION

| Formulation | Ingredients | Wt % Formulation |
|---|---|---|
| Carrier | Sodium Sulfate | 82.58 |
| Binder | Maleic acid/acrylic acid copolymer | 4.61 |
| Antifoam Compound | Hydrophobic Fluid Or Mixture Of Hydrophobic Fluids: 91% Silica Cab-O-Sil TS-530: 6% Silica Aerosil R-972: 3% | 11.63 |
| Silicone Polyether | SPE4 | 1.17 |

TABLE 4

GRANULE EXAMPLES

| Example | Hydrophobic Fluid | Silicone Polyether |
|---|---|---|
| Granule Example 1 | HF1 | SPE4 |
| Granule Example 2 | 50/50 Weight Mixture of HF1 and HF3 | SPE4 |
| Granule Example 3 | HF2 | SPE4 |
| Granule Example 4 | HF4 | SPE4 |

Application Examples in Laundry Detergents:

After formation, 8 g detergent powder (Surf Excel India or Persil Express) is mixed with the aforementioned granules of Examples 1 to 4 (at a level calculated to obtain 0.1% antifoam compound by weight versus detergent) and added to 2 L of water having a hardness of 12 FH, Ca/Mg 4:1 at a temperature of 30° C. After the powder is dissolved, the foam height in the wash is measured with a ruler and recorded.

Subsequently, the solution is whisked for 5 seconds and 160 g woven cotton is added. The woven cotton is dipped in the water 2 times and then squeezed by hand twice. After the second squeeze, the woven cotton is removed from the solution with a carryover of 300 g liquid (weight of wet woven cotton ~460 g). The foam height in the wash is measured with a ruler and recorded.

The squeezed woven cotton is then added to 2 L of rinse water of the same hardness. Each piece of woven cotton is dipped in the rinse water 2 times and subsequently squeezed. After the second squeeze, the woven cotton is removed from the rinse water with a carryover of 300 g liquid (weight of wet woven cotton ~460 g). The squeezed wet woven cotton, after rinsing, is then added to 2 L rinse water of the same hardness for a second rinse step using the same rinsing procedure described above. After removal of the woven cotton with a carryover of 300 g liquid (weight of wet woven cotton ~460 g) the foam height in the second rinse is measured with a ruler and recorded. After removal of the wet woven cotton, a picture is taken from a consistent height above the rinse vessel looking down towards a surface of the rinse water to illustrate the presence of foam, if any (height=40 cm). The results of these evaluations are set forth in Table 5 below, as an estimation of the amount of foam covering the surface of the water after the second rinse (percentage of surface covered with foam bubbles). The photographs are set forth in the Figures.

TABLE 5

APPLICATION EXAMPLES

Figure 2A:
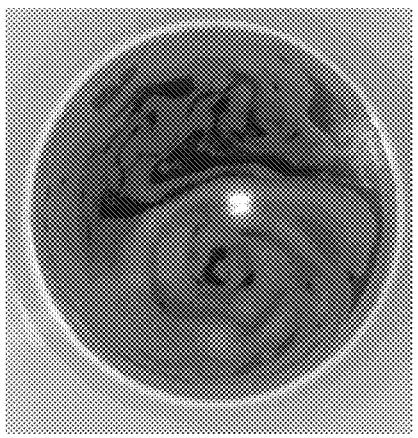
FIGS. 2A-2N are independent photographs of the top surfaces of water deposited in containers after rinsing woven cotton that was washed in water using various embodiments of detergent/emulsions of this disclosure, as also described in detail in the examples.

| Application Example | Description | Foam Height Upon Dissolution (cm) | Foam Height Upon Wash (cm) | % Surface Covered With Foam Bubbles | Image Of Foam After Second Rinse |
|---|---|---|---|---|---|
| Comparative Application Example 1 | Reference Surf Excel Detergent (No Antifoam; Comparative) | 4.3 | 3 | 60 | FIG. 1A |
| Application Example 1 | Reference Surf Excel Detergent + Granule of | 4.1 | 2.6 | 0 | FIG. 2A |

TABLE 5-continued

APPLICATION EXAMPLES

Figure 2B:
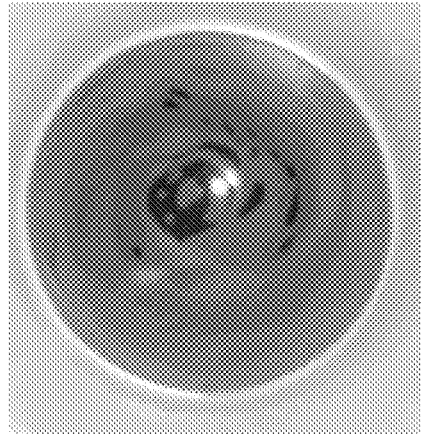
Figure 2C:
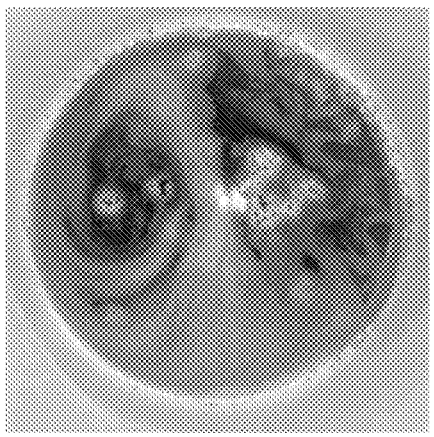
Figure 2D:
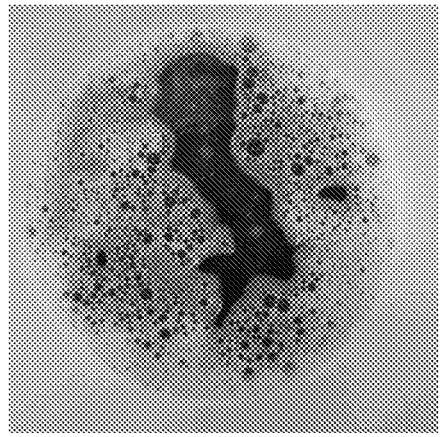

| Application Example | Description | Foam Height Upon Dissolution (cm) | Foam Height Upon Wash (cm) | % Surface Covered With Foam Bubbles | Image Of Foam After Second Rinse |
|---|---|---|---|---|---|
| Application Example 2 | Reference Surf Excel Detergent + Granule of Example 2 | 4.2 | 2.7 | 0 | FIG. 2B |
| Application Example 3 | Reference Surf Excel Detergent + Granule of Example 3 | 4.5 | 3.1 | 10 | FIG. 2C |

The results of these evaluations demonstrate that little or no decrease of the foam height is observed when dissolving the powder or during the wash. The foam height during the dissolution step is similar for the experiment where Surf Excel is tested without any antifoam granule (Comparative Application Example 1) and when it is used with antifoam granule (Application Examples 1 to 3), and the same is valid for the washing step. Significant defoaming occurs in the rinse. While foam bubbles are still visible at the surface of the bucket for Surf Excel alone (Comparative Application Example 1), no foam is visible when antifoams are used (Application Examples 1 to 3).

High Surface Tension Antifoams With Various Silicone Polyethers:

As set forth in Table 6, HF2 is combined with silica to obtain a high surface tension antifoam compound according to the procedure described above. The antifoam compound is then emulsified in Sokalan CP5 with silicone polyethers using the procedure described above to form emulsions of this disclosure.

TABLE 6

GRANULE COMPOSITION

| Formulation | Ingredients | Wt % Formulation |
|---|---|---|
| Carrier | Sodium Sulfate | 82.58 |
| Binder | Maleic acid/acrylic acid copolymer | 4.61 |
| Antifoam Compound | Antifoam Compound HF2: 91% Silica Cab-O-Sil TS-530: 6% Silica Aerosil R-972: 3% | 11.63 |
| Silicone Polyether | See Table 7-Granule Examples | 1.17 |

TABLE 7

GRANULE EXAMPLES

| Example | Hydrophobic Fluid | Silicone Polyether |
|---|---|---|
| Granule Example 5 | HF2 | SPE1 |
| Granule Example 6 | HF2 | SPE2 |
| Granule Example 7 | HF2 | SPE3 |
| Granule Example 8 | HF2 | SPE4 |

The aforementioned emulsions are then sprayed onto 200 g sodium sulfate using the procedure described above to obtain granules of antifoam compounds of this disclosure. These granules are then added to Surf Excel or Persil Express at a level calculated to obtain 0.1% active by weight versus a detergent. The same washing and rinsing procedure is followed as is described above. The results are set forth in Table 8 below. The photographs are set forth in the Figures.

TABLE 8

APPLICATION EXAMPLES

Figure 1B:
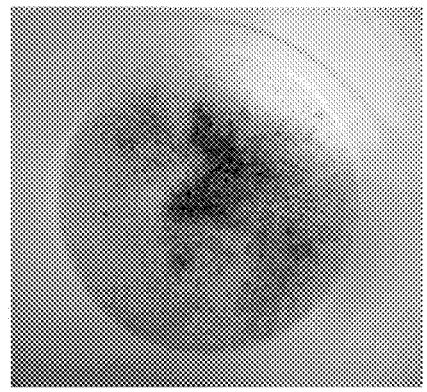
Figure 1C:
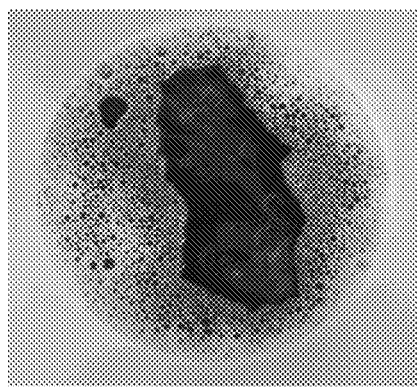
Figure 2E:
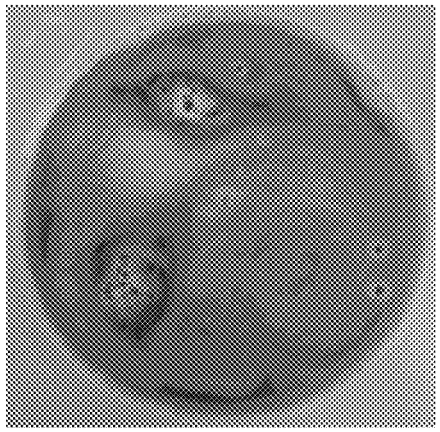
Figure 2F:
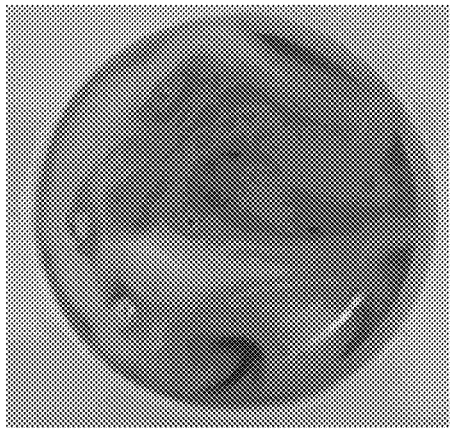
Figure 2G:
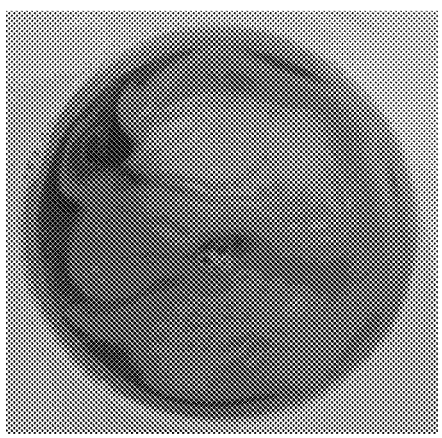
Figure 2H:
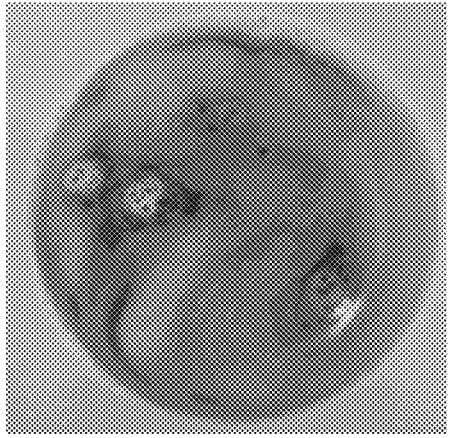
Figure 2I:
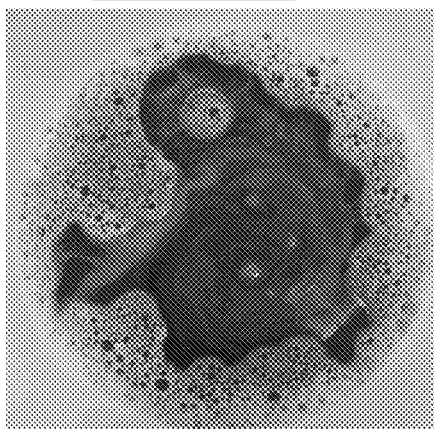
Figure 2J:
Figure 2K:
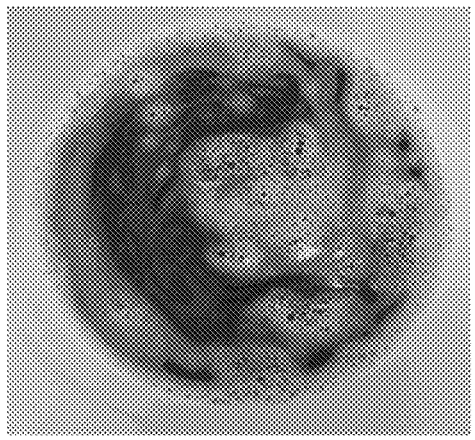

| Application Example | Description | Foam Height Upon Dissolution (cm) | Foam Height Upon Wash (cm) | % Surface Covered With Foam Bubbles | Image Of Foam After Second Rinse |
|---|---|---|---|---|---|
| Comparative Application Example 2 | Reference Surf Excel Detergent (Comparative) | 7.7 | 3.6 | 100 | FIG. 1B |
| Application Example 5 | Reference Surf Excel Detergent + Granule Example 6 | 6.9 | 3.4 | 10 | FIG. 2E |
| Application Example 6 | Reference Surf Excel Detergent + Granule Example 5 | 6.2 | 3.1 | 0 | FIG. 2F |
| Application Example 7 | Reference Surf Excel Detergent + Granule Example 7 | 5.8 | 3.2 | 0 | FIG. 2G |
| Application Example 8 | Reference Surf Excel Detergent + Granule Example 8 | Not Available | Not Available | 3 | FIG. 2H |
| Comparative Application Example 3 | Reference Persil Express (Comparative) | 6.5 | 3.8 | 60 | FIG. 1C |
| Application Example 9 | Reference Persil Express Detergent + Granule Example 5 | 5.9 | 3.3 | 40 | FIG. 2I |
| Application Example 10 | Reference Persil Express Detergent + Granule Example 7 | 5.5 | 2.9 | 30 | FIG. 2J |
| Application Example 11 | Reference Persil Express Detergent + Granule Example 6 | 4.8 | 3.4 | 20 | FIG. 2K |

The results of these evaluations demonstrate that whatever the silicone polyether used in the Application Examples 5-8 and 9-11, little or no decrease of the foam height is observed when dissolving the powder or during the wash. The foam height during the dissolution step is similar for the experiment where the detergent is tested without any antifoam (Comparative Application Examples 2 and 3) and when it is used with antifoam. This is the same for the washing step. Significant defoaming occurs in the rinse. While foam bubbles are still visible at the surface of the bucket for the detergent alone, no/little foam is visible when antifoams are used.

Silicone Polyethers vs. Other Emulsifiers

HF2 is combined with silica to obtain a high surface tension antifoam compound according to the procedure described above. The antifoam compound is then emulsified in Sokalan CP5 with the following surfactants using the procedure described above to form emulsions. The aforementioned emulsions are then sprayed onto 200 g sodium sulfate using the procedure described above to obtain granules of antifoam compounds, as set forth in Table 9 below.

TABLE 9

GRANULE EXAMPLES

| Granule Example | Emulsifier | Emulsifier % wt | Maleic acid/acrylic acid co-polymer % wt | Antifoam Compound % wt | Sodium Sulfate % wt |
|---|---|---|---|---|---|
| Comparative Example 1 | Dodecylbenzene-sulfonic acid-Anionic | 0.84 | 4.4 | 10.99 | 83.77 |
| Comparative Example 2 | Alkyl polyethylene glycol ether based on C10-Guerbet alcohol and ethylene oxide-Nonionic (Lutensol XP79 from BASF) | 0.81 | 4.3 | 10.84 | 84.05 |
| Comparative Example 3 | Inulin lauryl carbamate-Polymeric (Inutec SP1 from Beneo-Bio Based Chemicals) | 1.08 | 4.32 | 10.9 | 83.69 |
| Granule Example 9 | SPE5 | 1.08 | 4.39 | 10.98 | 83.55 |
| Granule Example 10 | SPE4 | 1.22 | 4.8 | 12.1 | 81.88 |

The obtained granules are then added to a reference detergent powder at a level corresponding to 0.1% of the antifoam compound by weight of the detergent powder. The reference detergent power is formed by spraying 13.58 g of sodium dodecyl benzene sulfonate (Maranil pasta A55) onto a mixture of sodium sulfate (13.43 g), soda ash (56.95 g) and sodium perborate (15.77 g), and then dried for 20 minutes at 60° C. in a fluidized bed.

The same washing and rinsing procedure is followed as is described above. The results are set forth in Table 10 below. The photographs are set forth in the Figures.

TABLE 10

APPLICATION EXAMPLES

Figure 1D:
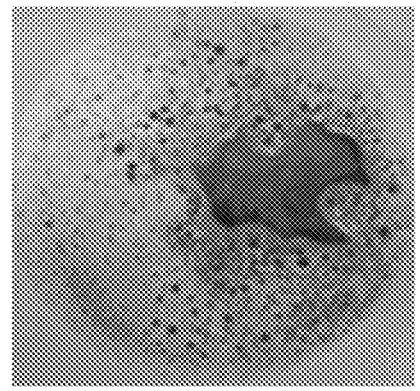
Figure 1E:
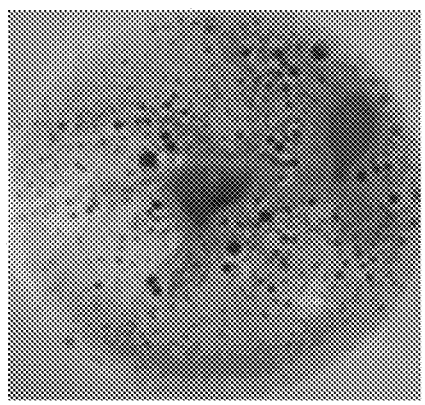
Figure 1F:
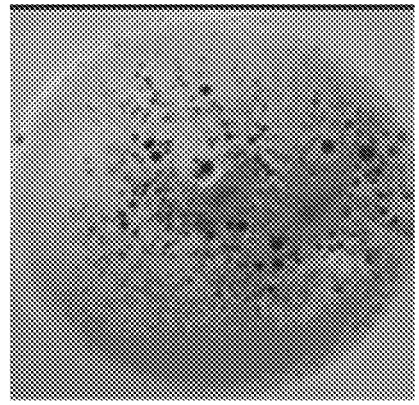
Figure 1G:
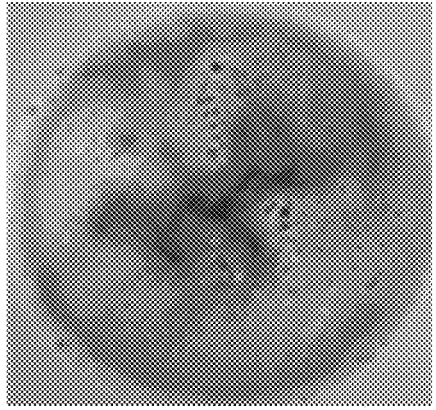
Figure 2L:
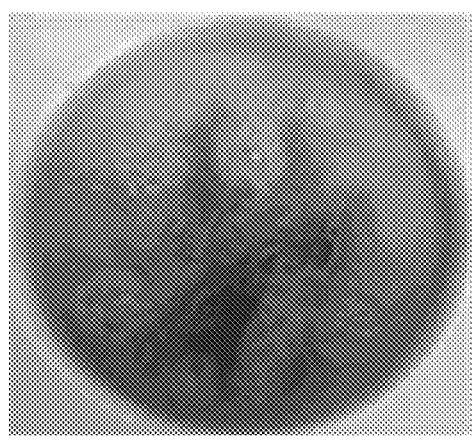
Figure 2M:
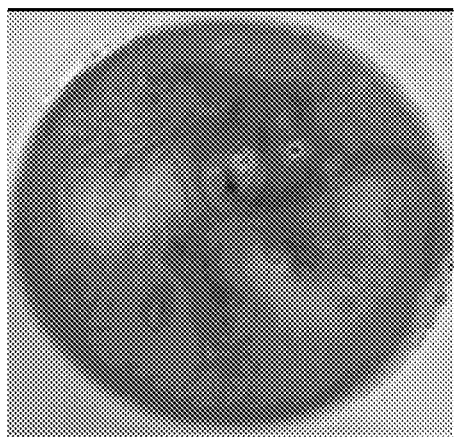

| | Detergent | Foam Height Upon Dissolution (cm) | Foam Height Upon Wash (cm) | % Surface Covered With Foam Bubbles | Image Of Foam After Second Rinse |
|---|---|---|---|---|---|
| Comparative Application Example 4 | Reference Detergent (Comparative) | 7.4 | 3.6 | 85 | FIG. 1D |
| Comparative Application Example 5 | Reference Detergent + Granule of Comparative Example 1 | 6.8 | 3.1 | 95 | FIG. 1E |
| Comparative Application Example 6 | Reference Detergent + Granule of Comparative Example 2 | 7 | 2.8 | 100 | FIG. 1F |
| Comparative Application Example 7 | Reference Detergent + Granule of Comparative Example 3 | 7.3 | 3.2 | 85 | FIG. 1G |
| Application Example 12 | Reference Detergent + Granule Example 9 | 6.8 | 3.2 | 0 | FIG. 2L |
| Application Example 13 | Reference Detergent + Granule Example 10 | 7.3 | 3.3 | 0 | FIG. 2M |

Results show that, within the second rinse, the antifoam compound emulsified with anionic, non-ionic and polymeric surfactants (Comparative Application Examples 5, 6 and 7, respectively) do not completely suppress the foam whereas surprisingly the examples where the antifoam compound has been emulsified with silicone polyethers such as SPE5 or SPE4 (Application Example 12 and Application Example 13, respectively) show a very good defoaming activity because there is only a thin layer of scum remaining at the surface compared to the Comparative Application Example 4 (Reference).

Silicone Polyethers combined with Comparative Antifoam Compounds

Various comparative antifoam compounds are emulsified in Sokalan CP5 with SPE4, described above, using the procedure described above to form emulsions. The comparative antifoam compounds are based on hydrophobic fluids having a surface tension <23, 24, or 27, mN/m.

HF5 is combined with silica to obtain a high surface tension antifoam compound according to the procedure described above. The antifoam compound is then emulsified in Sokalan CP5 with SPE4 using the procedure described above to form emulsions.

The aforementioned emulsions are then sprayed onto 200 g sodium sulfate using the procedure described above to obtain granules of antifoam compounds. These compositions are set forth more specifically in Table 12 below.

TABLE 11

COMPARATIVE ANTIFOAM COMPOUNDS

| Comparative Antifoam Compound | Description | Surface tension (mN/m) of Hydrophobic Fluid (Drop Shape Method) |
|---|---|---|
| CAF1 | Antifoam compound made of alphamethylstyrene siloxane, silica (Sipernat D10 And Aerosil R972) and silicone resin | 22.0 (combination of alphamethyl-styrene siloxane and silicone resin) |
| CAF2 | Antifoam compound based on branched PDMS and silica (Aerosil 200) | 20.0 |
| CAF3 | Antifoam compound based on branched PDMS and silica (Sipernat D10) | 20.0 |

TABLE 12

GRANULE EXAMPLES

| Formulation | Ingredients | Wt % Formulation |
|---|---|---|
| Carrier | Sodium sulfate | 82.58 |
| Binder | Maleic acid/acrylic acid copolymer | 4.61 |
| Antifoam Compound | Antifoam compound selected from CAF1 to CAF3 Comparative Example 4: based on CAF1 Comparative Example 5: based on CAF2 Comparative Example 6: based on CAF3 Granule Example 11: using compound based on HF5 (91% wt HF5, 6% wt silica Cab-O-Sil TS-530 and 3% wt silica Aerosil R-972) | 11.63 |
| Silicone Polyether | SPE4 | 1.17 |

The aforementioned granules are then added to Surf Excel at a level calculated to obtain 0.1% active by weight versus a detergent. The same washing and rinsing procedure is followed as is described above. The results are set forth in Table 13 below. The photographs are set forth in the Figures.

TABLE 13

APPLICATION EXAMPLES

Figure 1H:
Figure 1I:
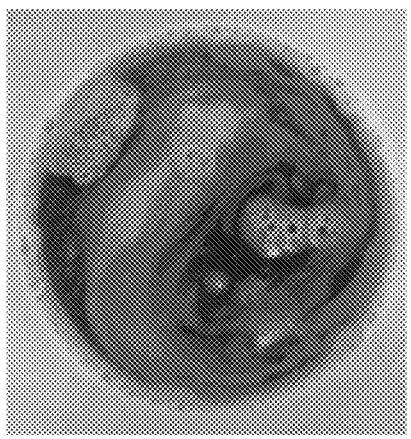
Figure 1J:
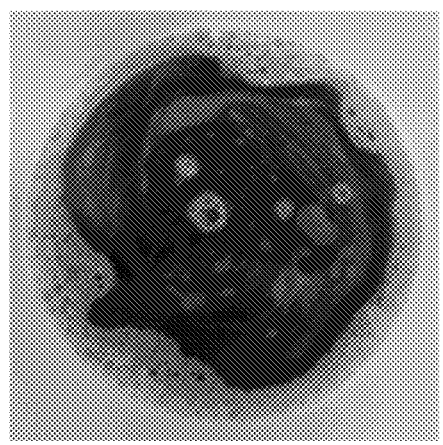
Figure 1K:
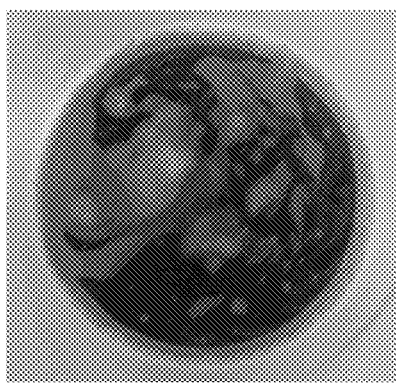
Figure 2N:
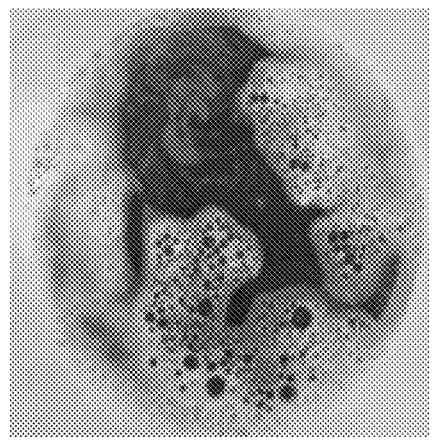

| | Detergent | Foam Height Upon Dissolution (cm) | Foam Height Upon Wash (cm) | % Surface Covered With Foam Bubbles | Image Of Foam After Second Rinse |
|---|---|---|---|---|---|
| Comparative Application Example 8 | Reference Surf Excel (Comparative) | 6.4 | 3.9 | 80 | FIG. 1H |
| Comparative Application Example 9 | Reference Surf Excel + Granule of Comparative Example 4 | 1.0 | 1.5 | 10 | FIG. 1I |
| Comparative Application Example 10 | Reference Surf Excel + Granule of Comparative Example 5 | 0.5 | 1.5 | 10 | FIG. 1J |
| Comparative Application Example 11 | Reference Surf Excel + Granule of Comparative Example 6 | 0.0 | 1.0 | 0 | FIG. 1K |
| Application Example 14 | Reference Surf Excel + Granule Example 11 | 6.9 | 3.3 | 40 | FIG. 2N |

The results of these evaluations demonstrate that these comparative granules based on hydrophobic fluids of surface tension <23, 24, or 27, mN/m show very high efficiency in the rinses, but also very strong activity at the dissolution stage where no foam is created when dissolving the powder or at the washing stage where very little foam appeared. This would be perceived as a strong negative for the consumers who associate foam creation with detergent activity, and thus contrary to the purpose of the present disclosure where the impact on the foam is intended at the rinsing stage only, with minimal to no impact at the dissolution and washing stages, such as provided by Application Example 14 using a hydrophobic fluid of surface tension 23, 24, or 27, mN/m according to the invention.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

What is claimed is:

1. An emulsion for forming an antifoam granule, said emulsion comprising:
    A) an oil phase comprising an antifoam compound, said antifoam compound comprising;
        i) 75 to 99 parts by weight of a hydrophobic fluid having a surface tension of from 23 to 40 mN/m, and
        ii) a hydrophobic filler dispersed in said hydrophobic fluid i);
    B) an aqueous phase comprising;
        iii) 20 to 60 parts by weight of a binder comprising a water soluble or water-dispersible polymer, and
        iv) water; and C) a silicone polyether;
wherein said emulsion is free of organosilicon resin and comprises at least 40 parts by weight of said hydrophobic fluid i).

2. The emulsion of claim 1, wherein said hydrophobic fluid i) has a surface tension of from 27 to 40 mN/m.

3. The emulsion of claim 1, wherein said silicone polyether C) is present in said emulsion in an amount of from 1 to 20 parts by weight per 100 parts by weight of said emulsion.

4. A method of forming an emulsion for forming an antifoam granule, said method comprising:
A) an oil phase comprising an antifoam compound, the antifoam compound comprising;
    i) 75 to 99 parts by weight of a hydrophobic fluid having a surface tension of from 23 to 40 mN/m, and
    ii) a hydrophobic filler dispersed in the hydrophobic fluid i);
B) an aqueous phase comprising;
    iii) 20 to 60 parts by weight of a binder comprising a water soluble or water-dispersible polymer, and
    iv) water; and
C) a silicone polyether;
wherein said method comprises the step of combining the oil phase A), the aqueous phase B), and the silicone polyether C) to form the emulsion; and
wherein the emulsion is free of organosilicon resin and comprises at least 40 parts by weight of the hydrophobic fluid i).

5. The method of claim 4, wherein the step of combining comprises mechanically agitating the oil phase A), the aqueous phase B), and the silicone polyether C).

6. The method of claim 4, wherein the step of combining comprises applying shear to the oil phase A), the aqueous phase B), and the silicone polyether C).

7. The emulsion of claim 3, wherein said silicone polyether C) is present in said emulsion in an amount of from 1 to 10 parts by weight per 100 parts by weight of said emulsion.

8. The emulsion of claim 1, wherein said silicone polyether C) is chosen from:

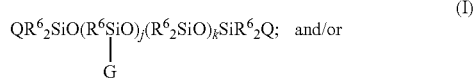  (I)

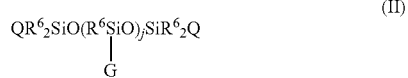  (II)

and combinations thereof, wherein $R^6$ is a monovalent hydrocarbon or halogenated hydrocarbon group, Q is $R^6$ or G, j has a value of 1 to 150, k has a value of 0 to 400 and G is a polyoxyalkylene group having a formula chosen from:

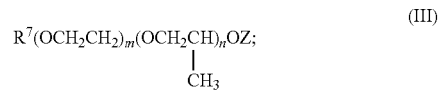  (III)

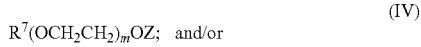  (IV)

  (V)

and combinations thereof, wherein $R^7$ is a divalent hydrocarbon group having 1 to 20 carbon atoms, m has an average value of about 1 to 50, n has an average value of 1 to about 50 and Z is chosen from hydrogen, an alkyl radical having 1 to 6 carbon atoms and an acyl group having 2 to 6 carbon atoms.

9. The emulsion of claim 1, wherein said hydrophobic fluid i) is chosen from a silicone fluid, an organic fluid, and combinations thereof.

10. The emulsion of claim 9, wherein said hydrophobic fluid i) is said silicone fluid and wherein said silicone fluid is chosen from the group of alkylsiloxanes having an alkyl group having from 12 to 14 carbon atoms, arylsiloxanes, arylalkylsiloxanes, a siloxane that is the reaction product of a methyl hydrogen (MeH) siloxane, an alkylmethacrylate having an alkyl group having 8 to 30 carbon atoms, and an alkene having 8 to 30 carbon atoms, and combinations thereof.

11. The emulsion of claim 1, wherein said oil phase A) is present in an amount of from 20 to 80 parts by weight and said aqueous phase B) is present in an amount of from 10 to 70 parts by weight per 100 parts by weight of said emulsion.

12. The emulsion of claim 1, wherein said hydrophobic fluid i) is present in said oil phase A) in an amount of from 80 to 95 parts by weight per 100 parts by weight of said oil phase A).

13. The emulsion of claim 1, wherein said hydrophobic filler ii) is present in said oil phase A) in an amount of from 0.5 to 50 parts by weight per 100 parts by weight of said hydrophobic fluid i).

14. The emulsion of claim 1, wherein said binder iii) is present in said aqueous phase B) in an amount of from 20 to 50 parts by weight per 100 parts by weight of said aqueous phase B).

15. An antifoam granule formed with said emulsion of claim 1.

16. The emulsion of claim 1, wherein said emulsion comprises at least 50 parts by weight of said hydrophobic fluid i).

17. The method of claim 4, wherein the emulsion comprises at least 50 parts by weight of the hydrophobic fluid i).

\* \* \* \* \*